United States Patent
Burton et al.

(10) Patent No.: US 6,563,971 B1
(45) Date of Patent: May 13, 2003

(54) OPTICAL FIBER MACH-ZEHNDER INTERFEROMETER EMPLOYING MINIATURE BENDS

(75) Inventors: Thomas Roy Burton, Memphis, TN (US); Colm V. Cryan, Charlton, MA (US); Stavros Dariotis, Attleboro, MA (US); Margaret C. Manty, Whitinsville, MA (US); David W. Stowe, Milford, MA (US)

(73) Assignee: Alcoa Fujikura Limited, Franklin, TN (US)

( * ) Notice: Subject to any disclaimer, the term of this patent is extended or adjusted under 35 U.S.C. 154(b) by 347 days.

(21) Appl. No.: 09/603,455

(22) Filed: Jun. 23, 2000

Related U.S. Application Data

(60) Provisional application No. 60/140,544, filed on Jun. 23, 1999, provisional application No. 60/171,216, filed on Dec. 16, 1999, provisional application No. 60/171,241, filed on Dec. 16, 1999, and provisional application No. 60/171,238, filed on Dec. 16, 1998.

(51) Int. Cl.⁷ .................................................. G02B 6/26
(52) U.S. Cl. ............................................ 385/15; 385/39
(58) Field of Search ............................ 385/15, 32, 39, 385/48, 14

(56) References Cited

U.S. PATENT DOCUMENTS

| | | | | |
|---|---|---|---|---|
| 4,753,529 A | * | 6/1988 | Layton | 250/227.27 |
| 5,138,676 A | * | 8/1992 | Stowe et al. | 385/32 |
| 5,452,393 A | | 9/1995 | Stowe et al. | 385/123 |
| 5,715,348 A | | 2/1998 | Falkenberg et al. | 385/135 |
| 5,920,666 A | * | 7/1999 | Digonnet et al. | 385/16 |
| 6,115,520 A | * | 9/2000 | Laskowski et al. | 385/50 |
| 6,226,091 B1 | * | 5/2001 | Cryan | 356/477 |
| 6,243,525 B1 | * | 6/2001 | Luizink et al. | 385/132 |
| 6,314,219 B1 | * | 11/2001 | Zhang et al. | 385/32 |
| 6,363,191 B1 | * | 3/2002 | Gillham et al. | 385/48 |

FOREIGN PATENT DOCUMENTS

JP    2001108859 A  *  4/2001  ........... G02B/6/255

OTHER PUBLICATIONS

David W. Stowe and Frederick J. Gillham, "Miniature Low–loss Fiber Bends Offer Dramatic Flexability in Component and Circuit Design", *Lightwave*, Jul. 1998.

* cited by examiner

*Primary Examiner*—John D. Lee
*Assistant Examiner*—Sarah U Song
(74) *Attorney, Agent, or Firm*—Hoffmann & Baron, LLP

(57) ABSTRACT

An optical fiber Mach Zehnder Interferometer includes a first and second elongate optical fiber having a core and a cladding, first and second couplers wherein the cladding of the first optical fiber is coupled to the cladding of the second optical fiber. The first optical fiber includes a first elongate interfering arm where the first optical fiber extends between the first and second couplers. The first interfering arm includes a miniature bend formed therein. The second optical fiber includes a second elongate interfering arm extending between the first and second couplers and may also include a miniature bend formed therein. The miniature bends are contemplated to be either packed or unpackaged. The fibers may exhibit different coefficients of thermal expansion to maintain the path length differences of the interfering arms.

24 Claims, 5 Drawing Sheets

OPTICAL FIBER MACH-ZEHNDER INTERFEROMETER EMPLOYING MINIATURE BENDS

This application claims the benefit of U.S. Provisional Application Nos. 60/140,544, filed on Jun. 23, 1999; 60/171,216, filed on Dec. 16, 1999; 60/171,238, filed on Dec. 16, 1999; and 60/171,241, filed on Dec. 16, 1999.

FIELD OF THE INVENTION

The present invention relates to the field of optical fiber Mach Zehnder interferometers. More specifically, the present invention is directed to an optical fiber Mach Zehnder interferometer having miniature bends in one or more of its interfering arms.

BACKGROUND OF THE INVENTION

It is well known to form an unbalanced Mach Zehnder interferometer with two couplers across a pair of straight parallel fibers. FIG. 1 depicts a typical fiber optic Mach Zehnder interferometer 10 of the prior art. Interferometer 10 includes a first and second elongate optical fiber 12 and 14 which are optically-coupled at a first and second optical coupler 22 and 24. Fibers 12 and 14 each define an interfering arm 16 and 18, respectively, extending between couplers 22 and 24. Interfering arms 16 and 18 are arranged to have unequal optical lengths by known methods such as having one of the interfering arms longer than the other, utilizing fibers with different propagation constants, or a combination of these approaches. The magnitude of the imbalance in the optical path length of these phase-sensitive interfering arms determines the wavelength sensitivity of the interferometer.

If the two phase-sensitive segments are perfectly balanced in optical path length, then the light launched into fiber 12 couples with fiber 14 at coupler 22 and interferes at coupler 24 so that all of the light emerges from fiber 12 past coupler 24. If the phase-sensitive segments 16 and 18 are unbalanced, then the light will emerge in various ratios from fibers 12 and 14 past coupler 24 depending on the wavelength of the light and the magnitude of the path-length imbalance. Typically the light oscillates between the top and bottom fiber as the wavelength is increased. The larger the path-length imbalance, the smaller the wavelength change which results in the transfer of the light from one fiber to the other.

It is difficult, however, to create fiber segments with physically different lengths without introducing loss or making the construction tedious and difficult. Moreover, as shown in FIG. 1, the resulting structure of interferometer 10 has fibers emerging in opposing directions so that additional space has to be allowed to accommodate the bend radius of the fibers at both ends during subsequent packaging.

It is also known, however, to impart miniature bends to an optical fiber so as to reduce its minimum radius of curvature. As disclosed in the commonly-assigned U.S. Pat. No. 5,138,676 to Stowe et al., which is hereby incorporated by reference in the present application, the transmissive optical core of an optical fiber may be drawn to a significantly reduced diameter. The reduced core may be bent and then annealed to provide a bend in the optical fiber which exhibits very low optical power loss. Miniature bends may be formed having a radius of less than 0.5 millimeters without high attenuation and with low internal stress. For example, the technology allows low-loss 180° bends to be formed in a package less than 2.0 millimeters in diameter and 8.0 millimeters long. Such low-loss bends may be formed in both singlemode and multimode fibers.

The diameter reduction is typically achieved by tapering the fiber, chemically removing some of the cladding glass, or a combination of these techniques. For a singlemode device, the fiber is processed so that the fundamental mode of the original fiber evolves adiabatically into the fundamental mode of the modified fiber to avoid light loss. The bend may be housed in a variety of packages provided no material comes into contact with the fiber in the processed region.

There is therefore a need for an optical Mach Zehnder interferometer which incorporates miniature bends in its component optical fibers so as to minimize interferometer size, thermal sensitivity, and vibration sensitivity.

SUMMARY OF THE INVENTION

The present invention provides an optical fiber Mach Zehnder Interferometer having a first and second elongate optical fiber, each having a core and a cladding, and first and second couplers wherein the cladding of said first optical fiber is coupled to the cladding of the second optical fiber. The Mach Zehnder Interferometer of the present invention further includes a first elongate interfering arm formed by that portion of the first optical fiber extending between the first and second couplers, and a second elongate interfering arm comprising the second optical fiber extending between the first and second couplers. Additionally, the first interfering arm includes at least one miniature bend formed therein. The second interfering arm may also include a miniature bend formed therein. In one embodiment of the present invention, the miniature bend of the first interfering arm is nested within the second interfering arm.

Moreover, the Mach Zehnder Interferometer of the present invention may incorporate either prepackaged miniature bends or unpacked miniature bends. The interfering arms may be adhesively tacked to a supporting substrate with either an adhesive epoxy or, when employing unpackaged miniature bends, an adhesive gel. The Mach Zehnder Interferometer of the present invention may further exhibit reduced thermal sensitivity by selecting optical fibers having different thermal expansion coefficients to account for different total length changes due to temperature between two interfering arms of unequal length.

DETAILED DESCRIPTION OF PREFERRED EMBODIMENT

The present invention teaches that an Optical Fiber Mach-Zehnder Interferometer can be constructed with miniature bends formed in the phase-sensitive region thereof. The miniature bends can be used to shorten the length of the interferometer, to reduce the diameter of the interferometer or to create an unbalanced interferometer. The Mach Zehnder Interferometer of the present invention is unique in allowing a designer to tailor the physical layout of the component fibers to accommodate the dimensional limitations of a given workspace. In addition, the polarization dependence of the interferometer arms can be equalized by physically adjusting the arms of the interferometer.

Figure 1:
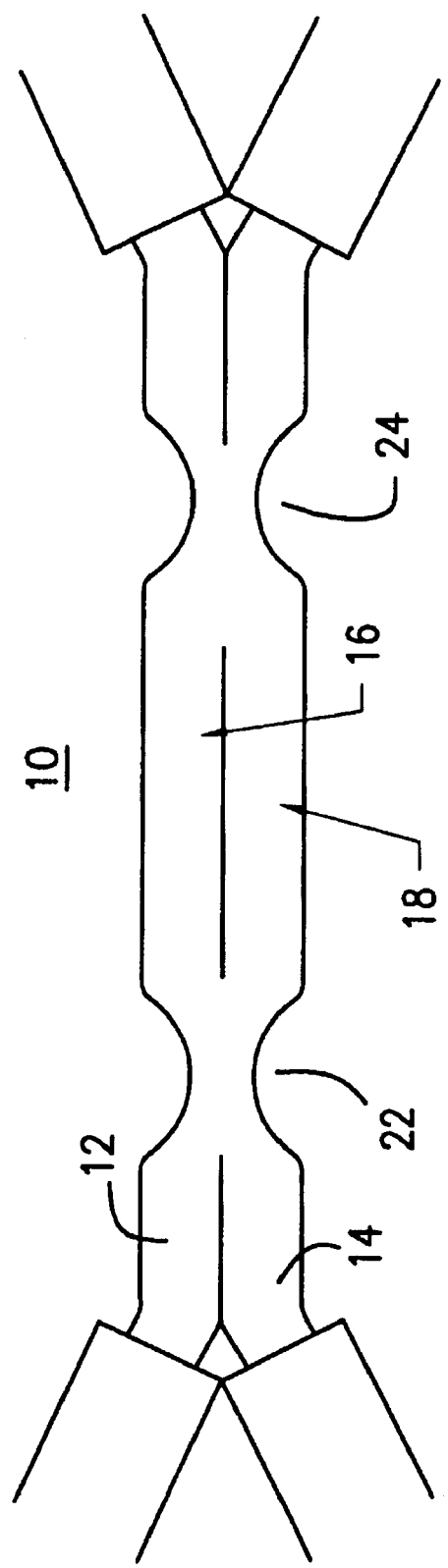
FIG. 1 shows a schematic diagram of a straight Mach Zehnder Interferometer.
Figure 2:
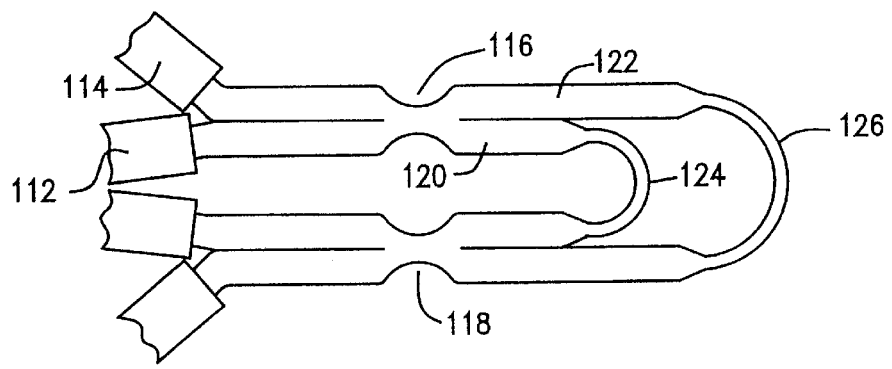
FIG. 2 shows a schematic diagram of a Mach Zehnder Interferometer of the present invention having miniature bends in the interfering arms.

FIG. 2 depicts an optical fiber Mach Zehnder Interferometer 110 of the present invention. Interferometer 110 is formed from a first and second elongate optical fiber 112 and 114 each having an inner core and an outer cladding. Fibers 112 and 114 are joined at couplers 116 and 118. Fiber 112 provides a first interfering arm 120 extending between couplers 116 and 118 and fiber 114 provides a second interfering arm 122 extending between couplers 116 and 118. Additionally, interfering arms 120 and 122 each include a centrally-located miniature bend 124 and 126, respectively, having a bend curvature of approximately 180°. Interfering arm 120 and miniature bend 124 is desirably nested within interfering arm 122 and miniature bend 126. It is intended throughout this application that the term nested relates to one interfering arm and its associated miniature bend is bounded by a second interfering arm and its associated miniature bend. The term nested does not specifically dictate that one miniature bends be located within a segment defined between opposed ends of a second miniature bend.

The present invention thereby provides an interferometer of significantly reduced dimensions by employing miniature bends in at least one of the interfering arms. In conventional optical fibers, the lower refractive index of the cladding relative to the core establishes modes that propagate with negligible loss down the fiber. Light may be considered to be guided by total internal reflection at the core/cladding interface. With the miniature bend technology, the fiber diameter is reduced in the bend region, creating a structure in which the light is primarily guided by the surrounding air, which acts as a cladding, with the fiber in the reduced-diameter region acting as the core. Because the refractive index of the surrounding air is.near unity, the effective core/cladding index difference is approximately 0.46 in the bend region compared to a difference of 0.003 in the unmodified fiber. Consequently, the light is more tightly bound in the bend region and can sustain much smaller bend radii without coupling to radiative modes.

In spite of the very small 180° turn, the optical losses of a miniature bend are very low across the entire 1260- to 1650-nanometer spectral band, e.g. the maximum loss is less than 0.2 dB usually at the ends of the spectrum band. As a result, the bend can be used throughout the telecommunications windows at both 1300 and 1550 nanometers. Because the bend lies in a plane, it is presumed to have a small birefringence, but measured polarization-dependent losses are less than 0.003 dB.

Figure 3:
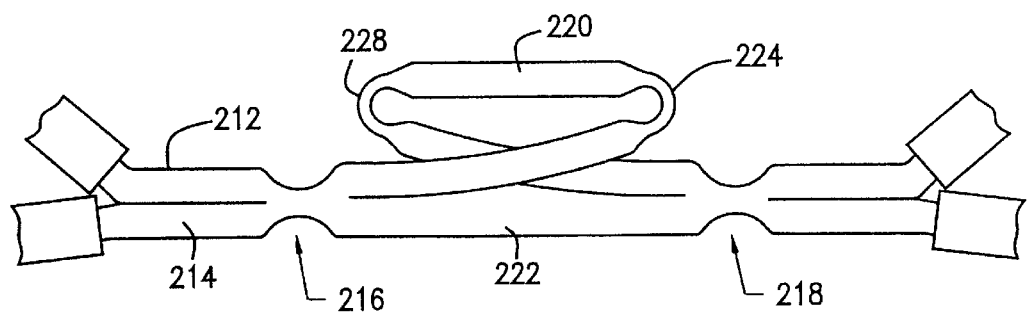
FIG. 3 shows a schematic diagram of a Mach Zehnder Interferometer with miniature bends in one of the interfering arms.
Figure 4:
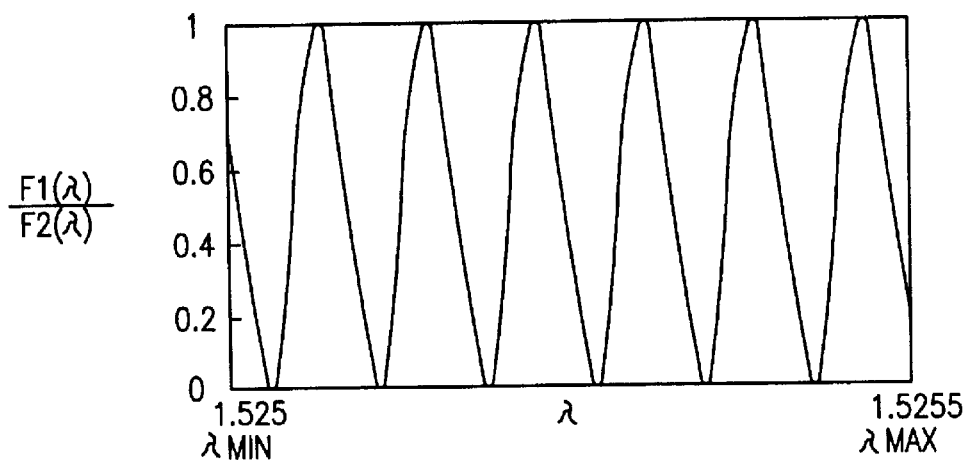
FIG. 4 provides a graph of the coupled output of an unbalanced Mach Zehnder Interferometer of the present invention having a 3 millimeter optical path difference.

FIG. 3 depicts another optical fiber Mach Zehnder Interferometer 210 of the present invention. Interferometer 210 is formed from a first and second elongate optical fiber 212 and 214 each having an inner core and an outer cladding. Fibers 212 and 214 are joined at couplers 216 and 218. Fiber 212 provides a first interfering arm 220 extending between couplers 216 and 218 and fiber 214 provides a second interfering arm 222 extending between couplers 216 and 218. Additionally, interfering arm 220 includes a first and second miniature bends 224 and 228 formed therein. Miniature bends 224 and 228 each provide a curvature of bending of approximately 120°, although other bending angles are clearly contemplated to realign the opposed ends of fibers 212 and 214. Interfering arm 222 is formed to be substantially straight. Interferometer 210 controls the wavelength response of the MZI by controlling the difference in optical path length of the two interfering arms. FIG. 4 shows the calculated spectral response of an interferometer of the present invention where the optical path length difference between the two arms is approximately 3 mm long.

Figure 5:
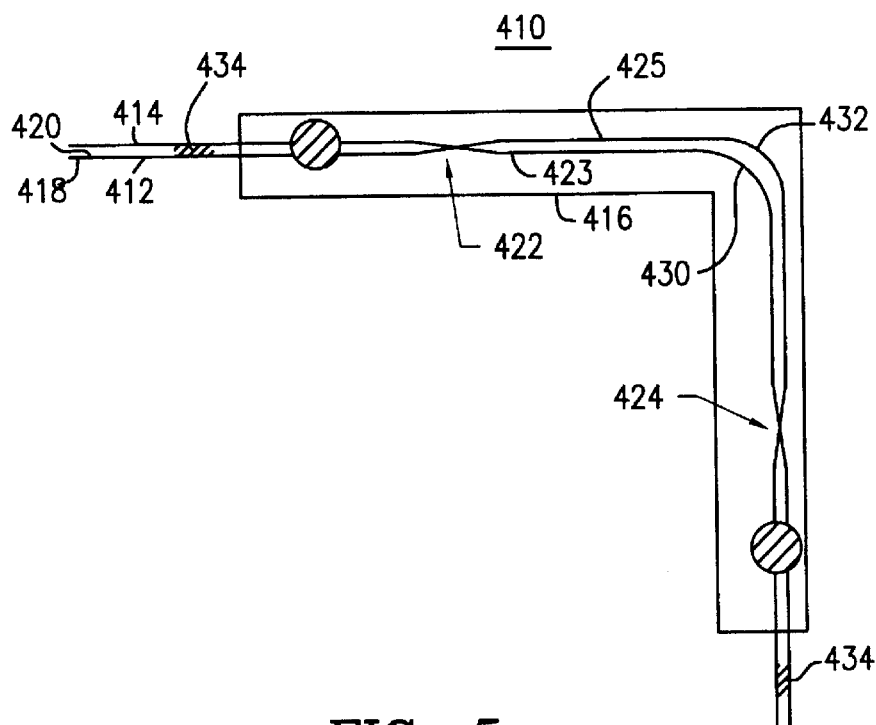
FIG. 5 depicts an alternate embodiment of the Mach Zehnder interferometer of the present invention employing 90° miniature bends in the interfering arms.

Referring now to FIG. 5, an unbalanced Mach Zehnder interferometer 410 may also be constructed in the novel configuration having 90° miniature bends for applications requiring a short device with leads emerging at right angles to each other. Interferometer 410 includes optical fibers 412 and 414 mounted to a right-angle substrate 416. Each optical fiber 412 and 414 includes an optically transmissive core 418 and a concentric cladding 420. First optical fiber 412 defines a first interfering arm 423 and second optical fiber 414 defines a second interfering arm 425 extending between first and second coupler 422 and 424. Interfering arm 423 includes a first 90° miniature bend 430 midway between coupler 422 and 424 and fiber 414 likewise includes a second 90° miniature bend 432 midway between coupler 422 and 424. Miniature bend 430 is nested within miniature bend 432. In this case, the path-length difference between the fibers is created by using bends of different radii of curvature for miniature bends 430 and 432.

The present invention also contemplates that the fibers used to fabricate the coupler need not necessarily be fused together as in the case of a polished block coupler. Additionally, couplers employed by the present invention may be symmetric or asymmetric. The splitting ratio of couplers of the present invention may be something other than 50%. The splitting ratio and maximum splitting ratio of the couplers need not necessarily be the same, i.e., the splitting ratio of the asymmetric couplers may be 40%. Furthermore, the interfering arms of the present invention need not necessarily be balanced. Hence, the structure can be used to make wavelength division multiplexers, with or without fiber Bragg gratings formed adjacent each coupler. However, it is further contemplated that fiber Bragg gratings 434 may be formed adjacent to each coupler as shown in FIG. 5, in accordance with commonly-assigned U.S. patent application Ser. No. 09/421,173 now U.S. Pat. No. 6,212,318, which is incorporated by reference herein.

The interferometer of the present invention may also be fabricated from one or more photosensitive fibers. Moreover, each coupler may be composed of more than two fibers. For example, a 1×3 coupler can be fabricated where one or more of the fibers is photosensitive and the remaining fibers are photo-insensitive.

Figure 6:
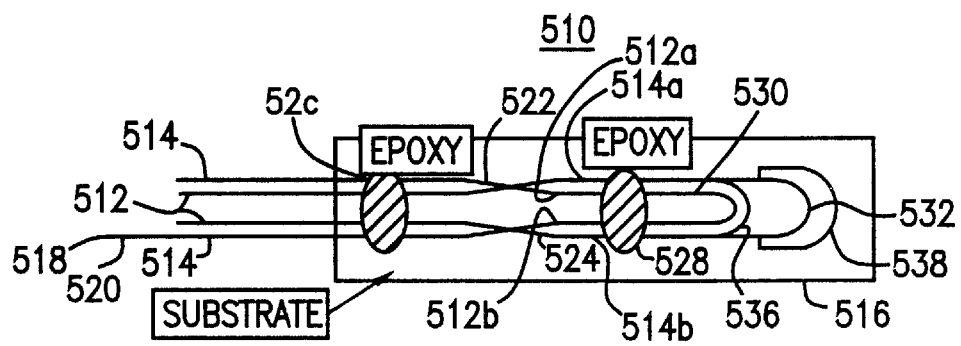
FIG. 6 depicts a folded Mach Zehnder interferometer of the present invention employing prepackaged miniature bends.

Interferometers 110 and 210 are depicted without having either a protective housing or mounting surface. It is known, however, that a miniature bend in an optical fiber may be housed in a variety of packages provided no package material comes into contact with the fiber in the processed region. Referring to FIG. 6, the present invention contemplates a fiber optic Mach Zehnder Interferometer 510 employing pre-packaged miniature bends. Interferometer 510 includes a first elongate optical fiber 512 and second elongate optical fiber 514 affixed to an elongate substrate 516. Each optical fiber 512 and 514 includes an optically transmissive core 518 and a concentric cladding 520.

First optical fiber 512 is nested within second optical fiber 514 between first and second coupler 522 and 524. Fiber 512 includes a first miniature bend 530 extending between coupler 522 and 524. Fiber 514 likewise includes a second miniature bend 532 extending between coupler 522 and 524. Miniature bends 532 and 534 are desirably prepackaged in that each is provided in a fixed pre-bent configuration within a protective housing 536 and 538 for assembly to substrate 516 and for coupling between the fibers at couplers 522 and 524. Optical fibers 512 and 514 are optically coupled at first and second couplers 522 and 524 and affixed to substrate 516 by a first epoxy tack 526 and a second epoxy tack 528 located to either side of couplers 522 and 524. Epoxy tack 528 desirably does not contact any portion of miniature bends 530 or 532.

Bends 530 and 532 are first fabricated and then packaged in their respective protective housings 536 and 538. Housing 536 thereby provides a pair of fiber leads 512a and 512b formed by the opposing ends of first optical fiber 512. Similarly, housing 538 provides a pair of fiber leads 514a and 514b formed by the opposing ends of second optical fiber 514. The leads of the packaged miniature bends are then combined to form fabricating couplers 522 and 524. The phase-sensitive region of the interferometer is thereby defined by the fibers extending between couplers 522 and 524. To avoid contact with substrate 516, couplers 522 and 524 are desirably lid suspended at least a fiber diameter above the substrate 516 and miniature bends 530 and 532 are suspended within their respective housings 536 and 538.

The present invention renders any desired physical path-length difference between the two interferometer legs by positioning one of the packaged bends further from the couplers than the other of the packaged miniature bends. In addition, the length of the interferometer of the present invention is cut approximately in half, as compared to an interferometer 10 of the prior art, when the packaged miniature bends are positioned near the midpoint of the phase-sensitive region. Also, all of the fiber leads 512a, 512b, 514a, and 514b emerge from one side of the interferometer so that the other end can be packaged close to a wall without allowance for the leads. The use of packaged miniature bends in this construction allows the interferometer to be constructed without the large lateral offset required if larger bends were placed in the phase-sensitive region of the interferometer.

Figure 7:
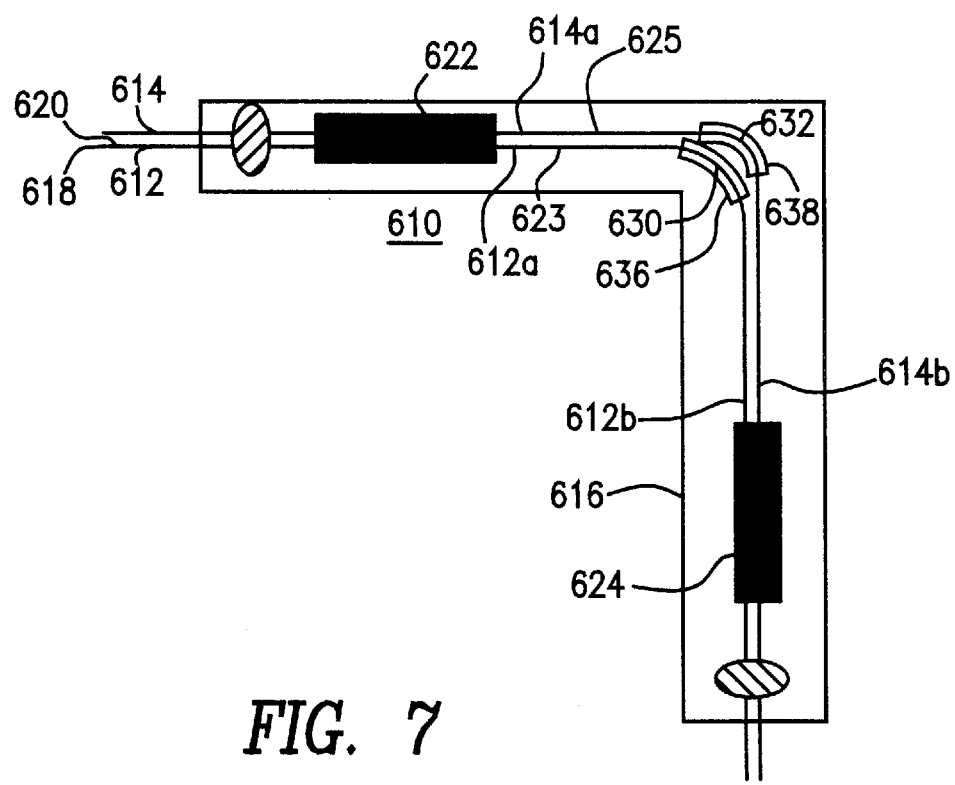
FIG. 7 depicts an alternate embodiment of the Mach Zehnder interferometer of the present invention employing 90° pre-packaged miniature bends in the interfering arms.

Referring now to FIG. 7, an unbalanced Mach Zehnder interferometer 610 may also be constructed in the novel configuration having 90° pre-packaged miniature bends for applications requiring a short device with leads emerging at right angles to each other. Interferometer 610 includes optical fibers 612 and 614 mounted to a right-angle substrate 616. Each optical fiber 612 and 614 includes an optically transmissive core 618 and a concentric cladding 620. First optical fiber 612 defines a first interfering arm 623 and second optical fiber 614 defines a second interfering arm 625 extending between first and second coupler 622 and 624. Interfering arm 623 includes a first 90° miniature bend 630 midway between coupler 622 and 624 and fiber 614 likewise includes a second 90° miniature bend 632.midway between coupler 622 and 624. Miniature bend 630 is nested within miniature bend 632. In this case, the path-length difference between the fibers is created by using bends of different radii of curvature for miniature bends 630 and 632.

Miniature bends 632 and 634 are desirably prepackaged in that each is provided in a fixed pre-bent configuration within a protective housing 636 and 638 for assembly to substrate 616 and for coupling between the fibers at couplers 622 and 624. Bends 630 and 632 are first fabricated and then packaged in their respective protective housings 636 and 638. Housing 636 thereby provides a pair of fiber leads 612a and 612b formed by the opposing ends of first optical fiber 612. Similarly, housing 638 provides a pair of fiber leads 614a and 614b formed by the opposing ends of second optical fiber 614. The leads of the packaged miniature bends are then combined to form couplers 622 and 624. The phase-sensitive region of the interferometer is thereby defined by the fibers extending between couplers 622 and 624. To avoid contact with substrate 616, couplers 622 and 624 are usually suspended at least a fiber diameter above the substrate 616 and miniature bends 630 and 632 are suspended within their respective housings 636 and 638.

Figure 8:
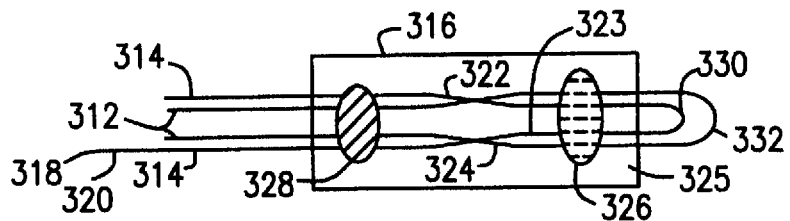
FIGS. 8 and 9 depict further embodiments of the Mach Zehnder interferometer of the present invention employing unpackaged miniature bends.
Figure 9:
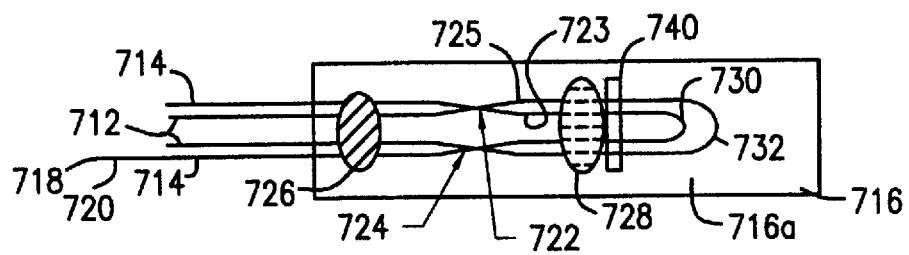
Figure 10:
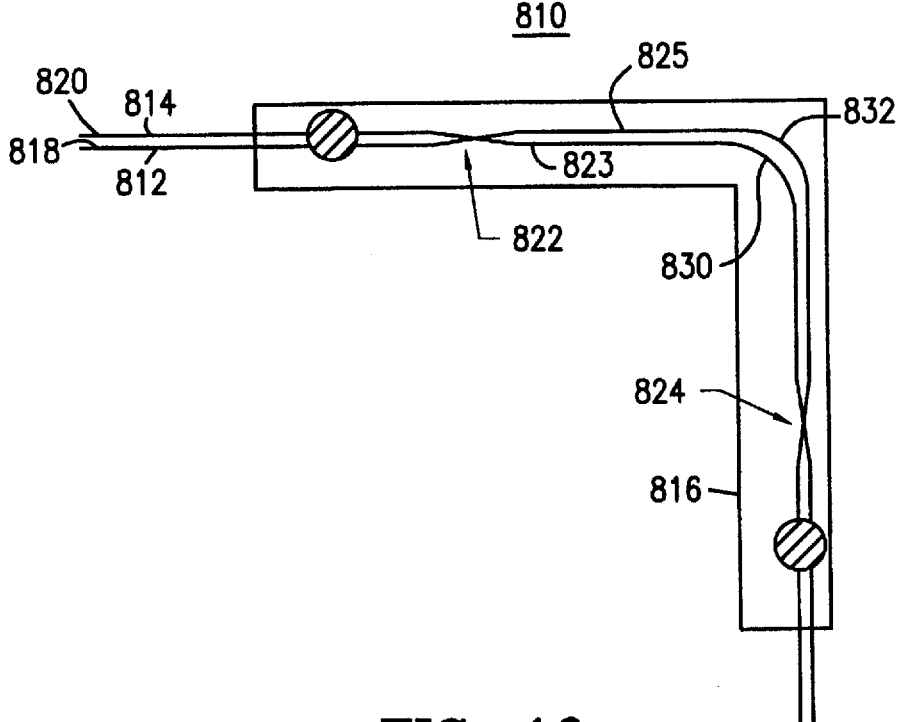
FIG. 10 depicts an alternate embodiment of the Mach Zehnder interferometer of the present invention employing 90° miniature bends in the interfering arms.

Referring now to FIGS. 8–10, the present invention further provides a means of forming a physically unbalanced Mach Zehnder interferometer in a compact single-sided construction by placing unpackaged miniature bends in the phase-sensitive region. The leads of the unpackaged miniature bends are then used to form the phase-sensitive region of the interferometer by fabricating two couplers across the four leads. In this construction the couplers are an integral part of the miniature-bend structure because there is no separate packaging for the miniature bends. As the individual miniature-bends are unpackaged, the associated mass of the phase-sensitive portion of the interferometer circuit is substantially reduced. Substrate configurations may then be selected to minimize size, thermal sensitivity, and vibration sensitivity.

With reference to FIG. 8, the present invention provides a fiber optic Mach Zehnder Interferometer 310 including a first elongate optical fiber 312 and a second elongate optical fiber 314 affixed to an elongate substrate 316. Each optical fiber 312 and 314 includes an optically transmissive core 318 and a concentric cladding 320. Optical fibers 312 and 314 are optically coupled at first and second couplers 322 and 324 and affixed to substrate 316 by a first adhesive tack 328 formed of epoxy and a second adhesive tack 326 formed from a gel which gently holds fibers 312.and 314 in place between couplers 322 and 324. The gel of tack 326 minimizes the thermal sensitivity of the interferometer as fibers 312 and 314 are not as rigidly held there as by the epoxy tack 324.

First optical fiber 312 is nested within second optical fiber 314 between first and second coupler 322 and 324. Fiber 312 includes a first interfering arm 323 extending between coupler 322 and 324. Interfering arm 323 includes a miniature bend 330 formed therein. Fiber 314 likewise includes an interfering arm 325 extending between coupler 322 and 324. Interfering arm 325 likewise includes a miniature bend 332 formed therein. Miniature bends 330 and 332 are desirably unpackaged prior to forming interferometer 310 so as to minimize the mass of material about the fibers. Miniature bends 330 and 332 are shown to be freely supported beyond the boundary of substrate 316.

With reference to FIG. 9, the present invention alternatively provides a fiber optic Mach Zehnder Interferometer 710 including a first elongate optical fiber 712 and second elongate optical fiber 714 affixed to an elongate substrate 716. Each optical fiber 712 and 714 includes an optically transmissive core 718 and a concentric cladding 720. First optical fiber 712 is nested within second optical fiber 714 between first and second coupler 722 and 724. Fiber 712 includes a first interfering arm 723 extending between coupler 722 and 724. Interfering arm 723 includes a miniature bend 730 formed therein. Fiber 14 likewise includes a second interfering arm 725 extending between coupler 722 and 724. Interfering arm 725 likewise includes a miniature bend 732 formed therein. Miniature bends 730 and 732 are desirably supported in spaced registry above the planar face 716a of substrate 716. Optical fibers 712 and 714 are optically coupled at first and second couplers 722 and 724 and affixed to substrate 716 by a first epoxy tack 726 and a gel tack 728. Epoxy tack 726 is located proximate the free ends fibers 712 and 714. Gel tack 728 is desirably located adjacent couplers 722 and 724 but short of miniature bends 730 and 732. The gel of tack 728 minimizes the thermal sensitivity of the interferometer as compared to the epoxy tack 726.

Interferometer 710 further provides a thin shim or pedestal 740 on substrate 716 for supporting interfering arms 723 and 725 thereon. Pedestal 740 is desirably located adjacent to gel tack 728 so as to support interfering arms 723 and 725 in spaced registry above substrate 716. Pedestal 740 also serves to help localize the applied adhesive by being a convenient place to apply the adhesive. Also the surface tension between the gel tack 728 and pedestal 740 may help to localize the gel so it does not contact the processed regions of the miniature bends or couplers. It is contemplated that pedestal 740 may be provided for any of the embodiments of FIGS. 5–10 to support the interfering arms and to localize the application of the adhesive epoxy or gel. In the embodiments of FIGS. 8–10, the couplers may simply be suspended above the substrate by the 206 adhesive epoxy on one side and by the gel, adhesive epoxy, or pedestal on the other side.

Referring now to FIG. 10, an unbalanced Mach Zehnder interferometer 810 may also be constructed in the novel configuration having 90° unpackaged miniature bends for applications requiring a short device with leads emerging at right angles to each other. Interferometer 810 includes optical fibers 812 and 814 mounted to a right-angle substrate 816. Each optical fiber 812 and 814 includes an optically transmissive core 818 and a concentric cladding 820. First optical fiber 812 defines a first interfering arm 823 and second optical fiber 814 defines a second interfering arm 825 extending between first and second coupler 822 and 824. Interfering arm 823 includes a first 90° miniature bend 830 midway between coupler 822 and 824 and fiber 814 likewise includes a second 90° miniature bend 832 midway between coupler 822 and 824. Miniature bend 830 is nested within miniature bend 832. In this case, the path-length difference between the fibers is created by using bends of different radii of curvature for miniature bends 830 and 832. Furthermore, interferometer 810 provides adhesive tacks opposite the phase-sensitive region of fibers 812 and 814, thereby obviating the need to adhesively tack the interfering arms of the phase-sensitive region at all.

As shown in FIGS. 8–10, the adhesive epoxy tack employed between the couplers and the miniature bends, as shown with interferometer 510, may be eliminated because of the small mass of the remaining fiber and bends. Alternatively, the epoxy employed between the couplers and the miniature bends by interferometer 510 may be replaced by a gel to gently hold the fibers in place without introducing a thermal sensitivity associated with the stress from an adhesive. The gel is a suitable packaging means for the present invention as only the relatively low mass and low inertial forces of the fibers need be countered. Consequently, the gel with its lower mechanical moduli is a suitable bonding agent. Also, the resulting structure is small and easy to fabricate.

Furthermore, as the material about the miniature bends is limited, potential thermally-induced stresses are significantly reduced. It is still further contemplated to use a low-stress adhesive rather than the gel so as to attach the fiber to the substrate without introducing anomalous thermal or mechanical effects. Either the gel or epoxy may be applied to the fiber in the region between the fused couplers and the miniature bends. If applied to the couplers directly or to the bends, however, the epoxy may cause loss of light from the device, because the fibers have been modified in these regions, allowing the optical fields to be significant at the outside edge of the fiber.

Moreover, the associated structure can be made quite compact, thereby not only improving the thermal stability of the interferometer but also reducing its size. In this structure, the actual coupler regions and miniature-bend regions should generally not be contacted by any material other than a very low refractive index and low-loss material such as air. Otherwise, contact with materials of index of refraction greater than about 1.3 may cause an increase in the loss of the coupler or miniature bends. An outer package (not shown) may also be positioned about the common substrate so as to avoid contact with the miniature bends so as to provide a single interferometer package.

Should the fibers be adhesively affixed to a common substrate, as shown in FIGS. 7–10, the interferometer of the present invention may become sensitive to thermal anomalies due to the thermal expansion of the substrate or the adhesive used and the resulting physical strain imparted to the fibers. The adhesive is thus a potential source of thermal sensitivity and phase instability. In an interferometer, any forces applied to the phase-sensitive portions of the fibers between the couplers in the interferometer can introduce differential phase shifts between the light propagating in the two segments. The differential phase shifts can result from a physical alteration of the differential path length resulting from a length change or bend, or they may result from differential changes in the refractive index of the segment to the other.

The index differences can be related to the applied stress through the stress-optic properties of the fiber. As the stress applied by the adhesive typically changes with temperature, changes in length and refractive index may occur in the fibers. As a result of this thermal sensitivity, any epoxy or adhesive which contacts the fiber in the phase-sensitive region may introduce differential phase shifts in the light transmitted through the fiber.

The interferometers of the present invention may be made less thermally sensitive by selecting fibers for their thermal coefficients of expansion and for their designed lengths between the couplers. The unbalanced construction between the couplers necessarily causes the physically longer leg to thermally expand more than the shorter leg with temperature. Typically the expansion of a material such as optical fiber can be expressed as:

$$\text{Delta}L = a * L * \text{Delta}T \text{ where} \qquad a)$$

DeltaL is the increase in the physical length of the fiber segment between couplers, a is the thermal expansion coefficient, L is the length of the segment between couplers, and DeltaT is the change in temperature. The differential expansion gives rise to a change in the wavelength dependence of the interferometer with temperature. This wavelength dependence is determined by the phase of the light passing through the fiber segments between the couplers. The phase is given by:

$$\text{Phase} = 2*PI*n*L/\text{Lambda} \qquad \text{b)}$$

where PI is a constant, n is the refractive index of the segment, L is the length of the segment, and Lambda is the wavelength. In order to keep the wavelength dependence of the interferometer constant with temperature, the phase change in the first segment must be equal to the phase change of the second segment; i.e.

$$\text{Phase 1} = \text{Phase 2}. \qquad \text{c)}$$

In general this phase stability is not met for an integrated interferometer. Therefore, such integrated devices may show some residual temperature sensitivity resulting from the variation of length and refractive index with temperature.

The present invention provides that the integrated unbalanced folded Mach Zehnder interferometer can be made thermally insensitive by selecting the lengths and refractive indices of the coupler-to-coupler segments appropriately. In order for the phase relationship c) to be independent of temperature, it follows that:

$$n1*dL1/dT + L1*dn1/dT = n2*dL2/dT + L2*dn2/dT \qquad \text{d)}$$

where d/dT denotes the derivative with temperature.
Therefore, this invention provides for a thermally stable interferometer by selecting the refractive indices and lengths of the fiber segments, and their thermal derivatives according to relationship d). This relationship can be simplified by approximating various terms. By using equation a) and approximately n1=n2, relationship d) can be approximated as:

$$n1*L1 + L1*dn1/dT = *aL2 + L2*dn2/dT \text{ or} \qquad \text{e)}$$

$$n1*a*(L1-L2) = L2*dn2/dT - L1*dn1/dT \qquad \text{f)}$$

By using different fibers, it is possible to select fibers which obey these relationships, giving rise to enhanced thermal stability. In general, since one of the legs must necessarily be made longer than the other to provide the desired phase mismatch, this longer leg will have a larger phase change due to the physical elongation of this segment. Therefore, optimum matching is achieved by fabricating the shorter leg with an index of refraction which has a larger thermal dependence. Then temperature insensitivity is achieved by having the high index thermal dependence of the shorter leg offset by the larger elongation phase shift of the longer segment. It should be noted that it is only the segments between the couplers which contribute significantly to the thermal dependence of the phase, because this is the region in which light is propagating in both fibers, resulting in interference in the second fiber.

While the particular embodiment of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An optical fiber Mach Zehnder Interferometer comprising:
   a first and second elongate optical fiber having a core and a cladding;
   first and second couplers wherein said cladding of said first optical fiber is coupled to said cladding of said second optical fiber;
   a first elongate interfering arm comprising said first optical fiber extending between said first and second couplers, wherein said first interfering arm includes at least one miniature bend formed therein; and
   a second elongate interfering arm comprising said second optical fiber extending between said first and second couplers, wherein said second interfering arm includes a miniature bend formed therein.

2. The optical fiber Mach Zehnder Interferometer of claim 1, wherein said first interfering arm includes more than one miniature bend formed therein.

3. The optical fiber Mach Zehnder Interferometer of claim 1, wherein said miniature bend of said first interfering arm is nested within said miniature bend of said second interfering arm.

4. The optical fiber Mach Zehnder Interferometer of claim 3, wherein said miniature bends of said first and second optical fiber are prepackaged miniature bends wherein each said miniature bend is supported within a protective housing such that opposed ends of each said fiber protrude from said protective housing, and whereby the position of said first and second couplers may be selected by the longitudinal spacing between said housings of said first and second prepackaged miniature bends.

5. The optical fiber Mach Zehnder Interferometer of claim 4, comprising a phase-sensitive region defined by the fibers extending between the first and second couplers, wherein said first and second optical fibers are mounted to an elongate substrate.

6. The optical fiber Mach Zehnder Interferometer of claim 5, wherein said opposed ends of each fiber are a first and second end of each of said first and second optical fibers and said first and second ends of said first and second optical fibers extend over one end of said substrate.

7. The optical fiber Mach Zehnder Interferometer of claim 3, wherein said miniature bend of said first optical fiber bends said first optical fiber about approximately 180 degrees.

8. The optical fiber Mach Zehnder Interferometer of claim 5, wherein said first ends of said first and second optical fibers extend over a first edge of said substrate and said second ends of said first and second optical fibers extend over a second edge of said substrate, said first edge of said substrate being non-opposed to said second edge of said substrate.

9. The optical fiber Mach Zehnder Interferometer of claim 3, wherein said miniature bend of said first optical fiber bends said first optical fiber about approximately 90 degrees.

10. The optical fiber Mach Zehnder Interferometer of claim 4, wherein said miniature bend of said first optical fiber bends said first optical fiber about a greater radius of curvature than said miniature bend of said second optical fiber.

11. The optical fiber Mach Zehnder Interferometer of claim 5, wherein said first and second optical fibers are adhesively affixed to said substrate at a location opposite said first and second couplers from said phase-sensitive region and wherein said first optical fiber is nested within said second optical fiber between said first and second couplers.

12. The optical fiber Mach Zehnder Interferometer of claim 5, wherein said first and second optical fibers are adhesively affixed to said substrate at a location along said phase-sensitive region by an adhesive gel.

13. The optical fiber Mach Zehnder Interferometer of claim 5, wherein at least one fiber within said phase-sensitive region extends over an edge of said substrate.

14. The optical fiber Mach Zehnder Interferometer of claim 1, wherein said first and second couplers are asymmetric.

15. The optical fiber Mach Zehnder Interferometer of claim 1, wherein said first and second couplers are symmetric.

16. The optical fiber Mach Zehnder Interferometer of claim 1 wherein at least one of said first, and second optical fibers is photosensitive.

17. The optical fiber Mach Zehnder Interferometer of claim 1, wherein said first coupler exhibits a splitting ratio of approximately 0.5.

18. The optical fiber Mach Zehnder Interferometer of claim 1, wherein said first coupler exhibits a splitting ratio of up to 0.4.

19. The optical fiber Mach Zehnder Interferometer of claim 1, wherein said first and second couplers exhibit unequal splitting ratios.

20. The optical fiber Mach Zehnder Interferometer of claim 1, wherein said first and second interfering arms are not balanced.

21. The optical fiber Mach Zehnder Interferometer of claim 1, further including a fiber Bragg grating adjacent each of said first and second couplers.

22. An optical fiber Mach Zehnder Interferometer comprising:

a first and second elongate optical fiber having a core and a cladding wherein said first elongate optical fiber exhibits a first thermal expansion coefficient and said second elongate optical fiber exhibits a second thermal expansion coefficient, said first thermal coefficient of expansion being higher than said second thermal expansion coefficient;

first and second couplers wherein said cladding of said first optical fiber is coupled to said cladding of said second optical fiber and said first optical fiber is nested within said second optical fiber between said first and second couplers;

a first elongate interfering arm comprising said first optical fiber extending between said first and second couplers, wherein said first interfering arm includes at least one miniature bend formed therein; and a second elongate interfering arm comprising said second optical fiber extending between said first and second couplers, wherein said second interfering arm includes a miniature bend formed therein.

23. An optical fiber Mach Zehnder Interferometer of claim 22, wherein said first and second optical fibers and interfering arms are selected in accordance with the equation $$n1*dL1/dT+L1*dn1/dT=n2*dL2/dT+L2*dn2/dT$$

where d/dT denotes the derivative with temperature, n1 denotes the index of refraction of said first interfering arm, L1 denotes the length of said first interfering arm, n2 denotes the index of refraction of said second interfering arm, and L2 denotes the length of said second interfering arm.

24. An optical fiber Mach Zehnder Interferometer of claim 22, wherein said first and second optical fibers and interfering arms are selected in accordance with the equation $$n1*\alpha*(L1-L2)=L2*dn2/dT-L1*dn1/dT$$

wherein n1 approximates the refractive index for both said first and second fibers, α approximates the thermal expansion coefficient of said fibers, L1 is the length of said first interfering arm, and L2 is the length of said second interfering arm, d/dT denotes the derivative with temperature, n1 denotes the index of refraction of said first interfering arm, and n2 denotes the index of refraction of said second interfering arm.

* * * * *

UNITED STATES PATENT AND TRADEMARK OFFICE
CERTIFICATE OF CORRECTION

PATENT NO. : 6,563,971 B1
DATED : May 13, 2003
INVENTOR(S) : Burton et al.

It is certified that error appears in the above-identified patent and that said Letters Patent is hereby corrected as shown below:

<u>Column 9,</u>
Line 40, delete "...n1*L1+L1*dn1/dT=*aL2+L2*dn2/dT..." and insert
-- ...n1*L1+L1*dn1/dT=n2*aL2+L2*dn2/dT --.

<u>Column 12,</u>
Line 32, delete "...approximates..." and insert -- a approximates --.

Signed and Sealed this

Fourteenth Day of October, 2003

JAMES E. ROGAN
*Director of the United States Patent and Trademark Office*